United States Patent [19]
Moore et al.

[11] 3,819,491
[45] June 25, 1974

[54] SEPARATING ADIPONITRILE FROM MIXTURES

[75] Inventors: Colin Moore; Michael Joseph Thornton, both of Blackley, England

[73] Assignee: Imperial Chemical Industries Limited, London, England

[22] Filed: July 24, 1972

[21] Appl. No.: 274,428

[30] Foreign Application Priority Data
July 23, 1971   Great Britain .................... 34624/71

[52] U.S. Cl. .................... 203/29, 203/85, 203/95, 260/464, 260/465.2, 260/465.4, 260/465.8 R
[51] Int. Cl. ............................................. C07c 121/26
[58] Field of Search ....... 203/29, 85, 95; 260/465.2, 260/465.8 R, 464

[56] References Cited
UNITED STATES PATENTS

| 2,144,340 | 1/1939 | Lazier | 260/465.2 |
| 2,748,065 | 5/1956 | Trieschmann et al. | 260/465.8 R X |
| 3,177,242 | 4/1965 | Adam et al. | 260/465.8 R |
| 3,325,532 | 6/1967 | Rushton et al. | 260/465.2 |
| 3,350,281 | 10/1967 | Romani et al. | 203/29 |
| 3,725,459 | 4/1973 | Yamada et al. | 260/465.2 X |

FOREIGN PATENTS OR APPLICATIONS
731,458   6/1955   Great Britain ............... 260/465.8 R

*Primary Examiner*—Joseph P. Brust
*Attorney, Agent, or Firm*—Cushman, Darby & Cushman

[57] ABSTRACT

2-Cyanocyclopenten-(1)-ylamine, an impurity in adiponitrile is removed from it by heating the mixture under pressure with water substantially free from dissolved inorganic matter to hydrolyse the impurity, and then separating adiponitrile from the hydrolysis product by distillation.

7 Claims, No Drawings

SEPARATING ADIPONITRILE FROM MIXTURES

This invention relates to a process for separating adiponitrile from admixture with 2-cyanocyclopenten-(1)-ylamine.

Crude adiponitrile contains significant amounts of 2-cyanocyclopenten-(1)-ylamine, from which it is difficult to separate efficiently by distillation because these two substances have boiling points very close to each other. Thus at 10 mm. mercury adiponitrile boils at 155°C and 2-cyanocyclopenten-(1)-ylamine at 148°C. Nevertheless the production of pure adiponitrile is of commercial importance as a stage in nylon manufacture, and to overcome the separation difficulty it has been proposed to hydrolyse the 2-cyanocyclopenten-(1)-ylamine to 2-cyanocyclopentanone which is of much lower boiling point. Hydrolysis methods hitherto proposed involve the use of strong acids, ammonium salts, bisulphates or bisulphites. All such methods introduce fresh problems since insoluble inorganic substances tend to separate from the organic material producing corrosion, blockage and other difficulties. Consequently hydrolysis of 2-cyanocyclo-penten-(1)-ylamine is not yet a successful commercial method of dealing with this troublesome impurity in crude adiponitrile.

According to the invention a process for removing 2-cyanocyclopenten-(1)-ylamine from a mixture with adiponitrile comprises heating said mixture with water substantially free from dissolved inorganic matter under pressure at temperatures of 140° to 280°C, optionally releasing steam to remove ammonia formed by hydrolysis of the 2-cyanocyclopenten-ylamine to 2-cyanocyclopentanone and thereby promote further hydrolysis of 2-cyanocyclopenten-(1)-ylamine, and subsequently separating adiponitrile from the hydrolysis products by distillation.

The process of the invention may be applied, if desired, to crude adiponitrile not previously subjected to any refinement process. This, however, involves treating a large bulk of material containing only a small amount of 2-cyanocyclopenten-(1)-ylamine.

Customarily crude adiponitrile is subjected to a "semi-refining" process in which a low boiling distillation portion containing most of the 2-cyanocyclopenten-(1)-ylamine and a considerable amount of adiponitrile is separated from the main bulk of adiponitrile. This low-boiling fraction is advantageously subjected to the process of the invention. Such a low-boiling fraction normally contains up to 40 percent by weight of 2-cyanocyclopenten-(1)-ylamine.

The amount of water used in the process of the invention is not critical, but enough should be used to effect the hydrolysis and provide sufficient steam for blowing off the ammonia. Too great an excess of water is best avoided on ecomonic grounds since ultimate removal of it is necessary. Depending on the amount of 2-cyanocyclopenten-(1)-ylamine in the adiponitrile the use of from about 2 percent to 200 percent of water by weight, based on the amount of adiponitrile is generally successful.

The hydrolytic effect produced in the process depends upon the amount of water used and the conditions of temperature, pressure and time. 2-Cyanocyclopentanone, the main hydrolysis product of the process, may hydrolyse further to 5-cyanovaleric acid which in turn may hydrolyse to adipamic acid. Concurrently some of the 2-cyanocyclopenten-(1)-ylamine may hydrolyse to 5-cyanovaleramide and this to adipamide. Moreover, 5-cyanovaleric acid reacts with 2-cyanocyclopenten-(1)-ylamine to produce 5-cyanovaleramide. All these further and alternative hydrolysis products are of higher boiling point than adiponitrile, which can thus be separated readily from the mixture by distillation.

Using small or moderate amounts of water (e.g. from 2 percent to 50 percent of water by weight relative to the adiponitrile) the use of a steam bleed to remove ammonia accelerates the hydrolysis of 2-cyanocyclopenten-(1)-ylamine to 2-cyanocyclopentanone. Preferably, therefore, the process is operated under these conditions. When larger amounts of water are used the acceleration produced by a steam bleed is not so pronounced, presumably because the 5-cyanovaleric acid and adipamic acids produced in greater quantity under these conditions tend to react with the ammonia and thus remove it from its sphere of influence.

Temperatures used in the process may vary over quite a wide range. Below 160°C, however, the hydrolysis is slow, whilst above 260°C it is fairly rapid, but some hydrolysis of adiponitrile may take place with the possibility of producing 2-cyanocyclopenten-(1)-ylamine from adiponitrile. Preferably, therefore, the temperature should be from 170° to 220°C.

The hydrolysis is carried out in a closed vessel. Pressures are not critical so long as the required hydrolysis temperature is reached. Release of steam to remove ammonia may also serve as a means of controlling the temperature and pressure. Pressures will normally be in the range 1 to 200 atmospheres, and preferably 4 to 20 atmospheres.

Analysis of effluent steam, even by such simple means as pH measurement, may if desired be used as a guide to the progress of the hydrolysis.

Times of operation for the hydrolytic treatment will, for best effect, depend upon the temperature and the amount of water used. Times from 15 minutes up to 16 hours have successfully been used, but time from 30 minutes to 4 hours are generally preferred.

After carrying out the hydrolytic treatment excess water may be removed by distillation at atmospheric pressure and adiponitrile may then be separated from the residue by distillation under reduced pressure. When operating in conjunction with a semi-refining process for adiponitrile, the residue, after water removal, may be fed into a normal distillation train without creating additional problems. Indeed it may be advantageous to operate this way since the low boiling 2-cyanocyclopentanone has the unexpected effect of minimising separation of solid 2-cyanocyclopenten-(1)-ylamine in condensers. One suitable operating method is to distill the residue for removal of high boilers and combine the distillate with crude adiponitrile for fractionation in the usual manner.

By means of the invention total yields of pure adiponitrile may economically be increased since an adiponitrile-containing fraction which has hitherto been discarded can now be treated in simple manner for the recovery of much of its adiponitrile content.

The invention is illustrated but not limited by the following Examples in which the parts and percentages are by weight:

EXAMPLE 1

100 Parts of adiponitrile containing 0.62 percent of 2-cyanocyclopenten-(1)-ylamine was heated in an autoclave with 12 parts of water at 250° – 260°C for 30 minutes. A slow release of ammonia/steam was maintained during the heating to keep the pressure at 120 p.s.i.g. After removing the water the mixture was found to contain only 0.13 percent of 2-cyanocyclopenta-(1)-ylamine plus 0.35 percent of cyanocyclopentanone, 0.3 percent of amide as 5-cyanovaleramide, and 0.11 percent of 5-cyanovaleric acid.

This mixture was fractionally distilled at reduced pressure (10 mm. Hg) to produce adiponitrile of semi-refined quality.

EXAMPLE 2

100 Parts of crude adiponitrile containing 0.56 percent of 2-cyanocyclopenten-(1)-ylamine together with other impurities as indicated below was heated with 25 parts of water in an autoclave at 250°C for 30 minutes. A slow release of steam/ammonia was maintained to keep the pressure at 250 p.s.i.g. during the heating. After removing the water the mixture was found to contain 0.09 percent of 2-cyanocyclopenten-(1)-ylamine, plus an increase of 0.30 percent cyanocyclopentanone, of 0.13 percent 5-cyanovaleric acid and 0.31 percent total amide as 5-cyanovaleramide.

This mixture was fractionally distilled at reduced pressure (10 mm. Hg) to produce adiponitrile of typical semi-refined quality.

EXAMPLE 3

A mixture of 60 parts of adiponitrile, and 40 parts of 2-cyanocyclopenten-(1)-ylamine was heated with 100 parts of water at 250° – 260°C for 1 hour. The pressure in the autoclave was maintained at 350 p.s.i.g. by means of a steam/ammonia bleed. After water removal the mixture was found to contain 1.8 percent of 2-cyanocyclopenten-(1)-ylamine, 24.8 percent total amide as 5-cyanovaleramide, 0.8 percent cyanocyclopentanone and 16.9 percent 5-cyanovaleric acid.

This mixture was fractionally distilled at reduced pressure (10 mm. Hg) to produce adiponitrile of typical semi-refined quality.

EXAMPLE 4

100 Parts of a low boiling portion from adiponitrile semi-refinement, containing 74 percent adiponitrile and 20.0 percent 2-cyanocyclopenten-(1)-ylamine was heated with 100 parts of water at 220°C for 2 hours. After water removal the mixture was found to contain 68 percent of adiponitrile, 2.0 percent of 2-cyanocyclopenten-(1)-ylamine, 6.1 percent of total amide as 5-cyanovaleramide, 2.1 percent of cyanocyclopentanone and 7.4 percent of 5-cyanovaleric acid.

This mixture was fractionally distilled at reduced pressure (10 mm. Hg) to produce adiponitrile of typical semi-refined quality.

EXAMPLE 5

100 Parts of a low-boiling fraction from adiponitrile semi-refinement, containing 55 percent adiponitrile and 21 percent 2-cyanocyclopenten-(1)-ylamine was heated under pressure with 75 parts of water at 190°C for 1.5 hours during which time approximately 30 parts of the water present were removed as steam. After water removal the mixture was found to contain 54 percent of adiponitrile, 2.9 percent of 2-cyanocyclopenten-(1)-ylamine, 5.5 percent of 2-cyanocyclopentanone, 5.8 percent of 5-cyanovaleric acid, and 3.7 percent of 5-cyanovaleramide.

This mixture was fractionally distilled at reduced pressure (10 mm. Hg) to produce a main fraction containing 98 percent adiponitrile.

We claim:

1. A process for removing 2-cyanocyclopenten-(1)-ylamine from a mixture with adiponitrile containing up to 40 percent by weight of the said amine which comprises adding to said mixture water alone in the amount of 2 percent to 200 percent by weight of the adiponitrile, heating in a closed vessel at a pressure of 1 to 200 atmospheres and a temperature of 140° to 280°C for from 15 minutes to 16 hours so as to hydrolyse the 2-cyanocyclopenten-(1)-ylamine and separating adiponitrile from the resulting product by distillation.

2. The process of claim 1 in which steam together with ammonia formed by hydrolysis of 2-cyanocyclopenten-(1)-ylamine to 2-cyanocyclopentanone are bled from the reaction vessel during said heating step to thereby promote further hydrolysis of 2-cyanocyclopenten-(1)-ylamine.

3. The process of claim 1 in which the proportion of water is from 2 percent to 50 percent by weight.

4. The process of claim 1 in which the starting mixture is a low-boiling fraction obtained by distilling crude adiponitrile and which contains most of the 2-cyanocyclopenten-(1)-ylamine present in the crude material together with adiponitrile.

5. The process of claim 1 in which the temperature of hydrolysis is 170° – 220°C.

6. The process of claim 1 in which the mixture obtained by heating, after distilling off water, is added to crude adiponitrile starting material and the resulting mixture is distilled to separate adiponitrile.

7. The process of claim 1 for removing 2-cyanocyclopenten-(1)-ylamine from a mixture with adiponitrile containing up to 40 percent by weight of 2-cyanocyclopenten-(1)-ylamine which comprises heating said mixture in a closed vessel with 2 percent to 50 percent by weight of water calculated on the weight of adiponitrile at a temperature of 160° to 260°C for a period of 30 minutes to 4 hours, releasing steam from the vessel during said period to maintain the pressure within the range of 4 to 20 atmospheres and to remove ammonia formed by hydrolysis of 2-cyanocyclopenten-(1)-ylamine to 2-cyanocyclopentanone, distilling water from the product and fractionally distilling the residue to obtain adiponitrile.

* * * * *